United States Patent

[11] 3,580,103

[72] Inventor Russell L. Shreve
         Troy, Mich.
[21] Appl. No. 846,713
[22] Filed Aug. 1, 1969
[45] Patented May 25, 1971
[73] Assignee Teleflex Incorporated
         North Wales, Pa.

[54] REMOTE FLEXIBLE CABLE
     10 Claims, 4 Drawing Figs.
[52] U.S. Cl. .................................................... 74/501
[51] Int. Cl. .................................................... F16c 1/28
[50] Field of Search ........................................ 74/501, 502

[56] References Cited
     UNITED STATES PATENTS
3,154,966  11/1964  Bratz ........................... 74/501

FOREIGN PATENTS
863,767  3/1961  Great Britain ............... 74/501

*Primary Examiner*—Milton Kaufman
*Attorney*—Barnard, McGlynn & Reising

ABSTRACT: A remote flexible control cable for transmitting tensile and compressive forces by means of a band member which is supported between two sets of a plurality of ball members with each set of ball members being held in place by a retainer and supported between a race or guide member and the band member; the sets of ball members, retainer and race or guide members all being supported for rotation within the cable; and the control cable being flexible in two directions in a common plane.

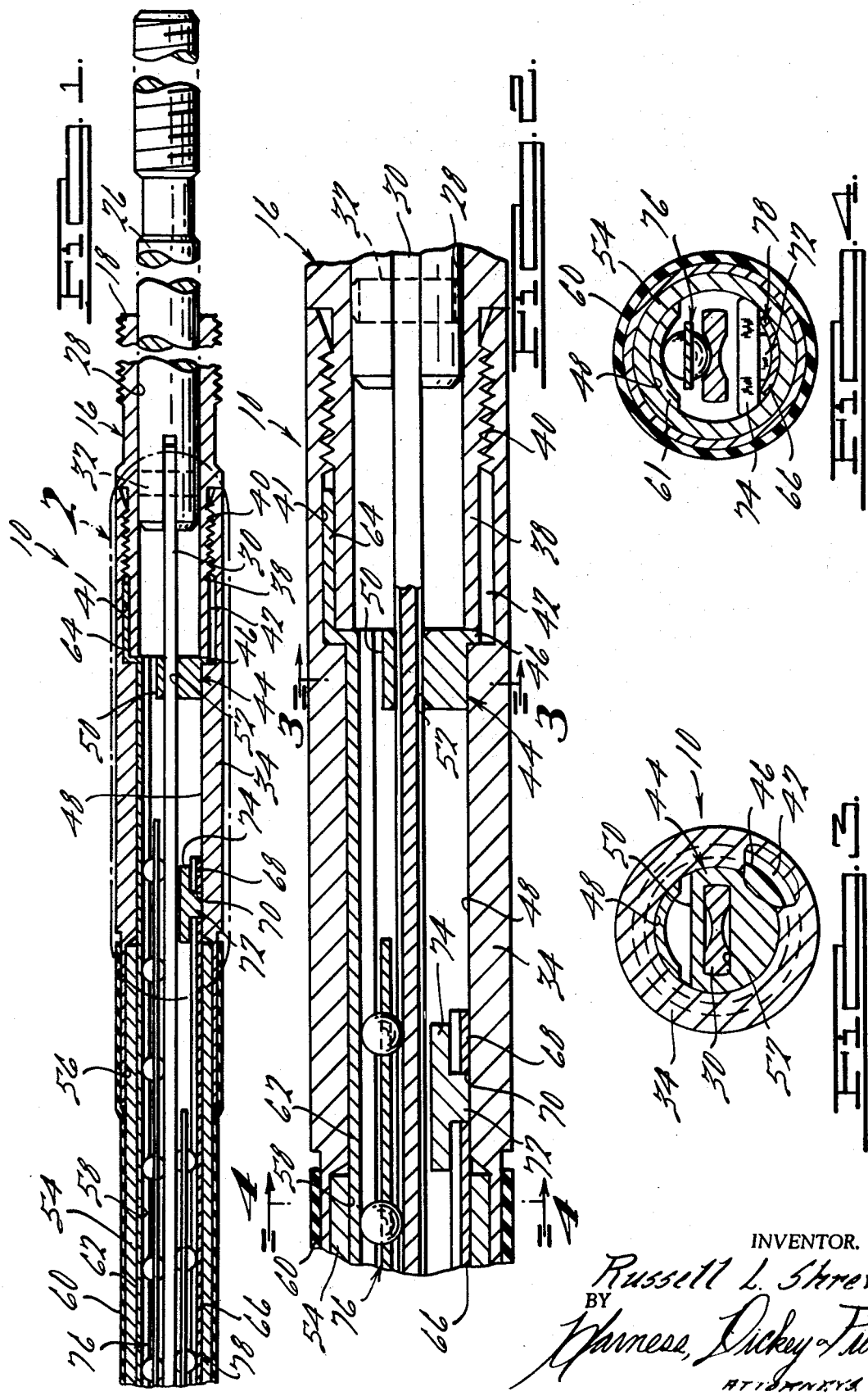

REMOTE FLEXIBLE CABLE

Summary Background of the Invention

The present invention relates to flexible control cables for transmitting tensile and/or compressive forces.

In a flexible control cable of the type utilizing antifriction members it is desirable that the internal members such as band member, etc., be able to rotate whereby the parts can freely orient themselves into a plane of least resistance for bending of the cable. Therefore, it is an object of the present invention to provide an improved flexible cable in which the internal members are free to rotate.

It is another general object of the present invention to provide an improved flexible control cable.

In prior flexible cable constructions, the cables as constructed have a degree of flexibility whereby the cable can be flexed or bent generally in only one direction in a single plane of bending. In the present invention, a construction is provided whereby the cable can be bent in either opposite directions in a single plane. With such a cable, the orientation of the cable in order to provide for bending in a direction in the plane of least resistance is less critical.

Therefore, it is another object of the present invention to provide a flexible control cable of the above-described type which can be flexed or bent in opposite directions in a single plane.

Other objects, features, and advantages of the present invention will become apparent from the subsequent description and the appended claims, taken in conjunction with the accompanying drawings, in which:

FIG. 1 is a longitudinal sectional view of a control cable and one end therefor embodying features of the present invention;

FIG. 2 is a view to increased scale of a portion of a cable of FIG. 1 enclosed in the dot dash lines indicated by the numeral 2 in FIG. 1;

FIGS. 3 and 4 are sectional views taken substantially along the lines 3–3 and 4–4 in FIG. 2.

Looking now to FIGS. 1 to 4, the motion transmitting remote control cable assembly is generally indicated by the numeral 10 and includes an outer tubular end member 16 having a bore extending therethrough. The outer end 18 of the end member 16 is externally threaded to facilitate mounting of the cable assembly. A control rod 26 is slidably supported within the end portion 28 of the bore through the end member 16. A motion transmitting core element comprising a generally flat flexible band member 30 is located coaxially within the cable assembly 10 and is fixed to the control rod 26 by means of a pin 32. Thus, as the control rod 26 is moved in and out from the bore portion 28, the flexible band 38 will also be moved within the cable assembly 10.

A tubular connector member 34 is connected to an inner end portion 38 of the end member 16 by means of a threaded connection 40. The inner end of the portion 38 has an outer diameter slightly reduced from the diameter of a counterbore 41 at the mating end of the connector 34. Thus, upon assembly of the connector member 34 to the end member 16 an annular space or cavity 42 will be defined by two radially spaced annular walls which extend generally parallel to the band member 30. The extreme end face of the portion 38 is also axially spaced from the end or shoulder of the counterbore 41. In other words, the innermost annular wall defined by the end portion 38 terminates short of the length of the outer annular wall defined by the counterbored portion 41 to define an axial opening.

A bushing member 44 is located generally within the base of the connector member 34 and has a flange 46 which is locatable in the axial space between the end of counterbore 41 and the extremity of the end member 16. Connector member 34 has a reduced diameter bore portion 48 with the bushing 44 extending axially partially therein. Bushing 44 is generally circular and is provided with a flat portion 50 at one side across which the race member 62 extends. The bushing 44 has a slot 52 which is located generally coaxially of the cable 10 and coaxially of the bores 48 and 28.

There is also included conduit means including a tubular flexible sheath 54 which is located within a counterbore 56 at the inner end of the connecting member 34. The sheath 54 has a through bore 58 which is of a diameter generally equal to the reduced diameter 48 through the connecting member 34. The sheath 54 and connecting member 34 are held together from relative rotation. The conduit means also includes a flexible, resilient sheath or covering 60 which is located over the sheath 54 and can be constructed of some suitable elastomeric material such as plastic or rubber.

A first race or guide member 62 extends substantially coextensively with the cable assembly 10 and terminates at its outer end in an outwardly bent doglike portion 64. The doglike portion 64 is located within the annular groove or cavity 42 in a clearance relationship therewith and is also located in the associated axial space such that the race 62 is free to rotate while still being held from axial movement. A second radially oppositely disposed race member 66 also extends generally coextensively with the cable 10 and terminates in an end portion 68 which is substantially axially spaced from the bushing member 44. The portion 68 is provided with a slot 70 wherein a tang 72 of a shoe member 74 can be located. The shoe member 74 provides support for the end portion 68 of the race 66 and is disposed for axial sliding movement between the band element 30 and the connector member 34. Note that the opposite end of the cable assembly 10 is preferably constructed in a manner identical to the construction previously described and hence, at the opposite end, the race 62 will be similarly secured via a dogleg 64 while the race 66 will be similarly spaced from bushing 44 and connected to a shoe member 74. As illustrated, the dogleg 64 is an integral part of the race 62. By the term "integral" as used herein, it is meant that the offset portion is fixedly and nonremovably secured to the race so as to function as a unitary construction.

The band member 30 extends coaxially through the cable assembly 10 and between the two race members 62 and 66 and is held generally centrally in position by a first and second ball retainer assemblies 76 and 78 respectively. The ball retainer assemblies are substantially identical with the exception that the assembly 76 will have a longer length than the assembly 78. The ball and retainer assemblies 76 and 78 each can be generally of the type shown in the copending application of William S. Molnar, filed Dec. 11, 1967, Ser. No. 696,678, now U.S. Pat. No. 3,509,782 which is incorporated herein by reference. Note that the shoe 74 is partially of a circular shape and is adapted to engage the band 30 to provide support for the end portion 68 of the race 66.

The cable assembly 10 can be flexed in either opposite direction generally in the plane of the drawing. If the ends of the cable 10 are moved upwardly towards each other i.e. in the plane of the paper, then the side of the cable assembly 10 in which the race 66 is located will tend to be lengthened, and with the construction as shown, the end portion 68 of race 66 and shoe 74 will be moved further away from the bushing 44. If the cable assembly 10 is flexed in the opposite direction in the plane of the paper, then the end portion 68 of race 66 and shoe 74 will be at the shortened side of the cable and these ends will be moved toward bushing 44. The end portions 68 and shoes 74 are located with sufficient clearance relative to the bushings 44 such that substantial flexing in either direction can take place. It should be noted that in prior constructions limited movement of the ends of one of the race members is permitted in one direction only whereby flexing can be accomplished in only one direction. These constructions require proper orientation of the cable assembly to locate the movable race member at the correct side of the cable. In the present invention orientation of the cable is no longer as critical. To further facilitate orientation of the races 62, 66, the band 30 and the ball retainer assemblies 76 and 78 to be in the plane of bending, these members are rotatably assembled to the connecting member 34 and end member 16. This is provided by the clearance relationship between the dogleg 64 and the annular space 42 as well as the axial space between the connecting member and end member 16. Thus rotation of these parts can readily occur.

Note that the flat surface 50 of the bushing 52 is spaced from the race 62 to assure reduction in frictional forces; the bushing member 44 will, of course, be rotated with the other members by means of band 30 in slot 52.

While it will be apparent that the preferred embodiment of the invention disclosed is well calculated to fulfill the objects above stated, it will be appreciated that the invention is susceptible to modification, variation and change without departing from the proper scope or fair meaning of the invention.

I claim:

1. In a motion transmitting remote control cable assembly of the type including a motion transmitting core element movably supported in conduit means by a plurality of roller elements which engage a pair of oppositely disposed race members, the improvement comprising connecting means attached to conduit means and defining an annular cavity, at least one of said race members having an integral end portion offset from the longitudinal axis of the remainder thereof and retained in said cavity against axial movement while being allowed to rotate freely about said annular cavity relative to said connecting means.

2. In an assembly as set forth in claim 1 wherein said annular cavity is defined by two radially spaced annular walls which extend generally parallel to said core element and said end portion of said race member is disposed therebetween.

3. In an assembly as set forth in claim 2 wherein the innermost of said annular walls terminates short of the length of the outer annular wall to define an axial opening into the interior of said conduit means and said end portion extends in a radial direction through said opening.

4. In an assembly as set forth in claim 3 wherein said connecting means includes an end member and a connector member threadedly connected together and defining said cavity therebetween.

5. In an assembly as set forth in claim 4 wherein said connector member includes a radially outwardly extending shoulder and an enlarged counterbored portion extending therefrom, said end member has an end portion extending into said counterbored portion and terminating in spaced relation to said shoulder to define said axial opening, the diameter of said end portion being smaller than the diameter of the counterbored portion to define said cavity therebetween.

6. In an assembly as set forth in claim 3 including a bushing having a flange disposed in said axial opening for retaining said bushing against axial movement while allowing said bushing to rotate, said bushing having a slot therethrough and said core element extends through said slot.

7. In an assembly as set forth in claim 6 wherein said bushing is generally circular with a flat portion on one side thereof across which said one of said race members extends.

8. In an assembly as set forth in claim 3 wherein the other race member has a free end for free axial movement.

9. In an assembly as set forth in claim 8 including a shoe connected to said free end and disposed for sliding movement between said core element and said connecting means.

10. In an assembly as set forth in claim 9 wherein both ends of said assembly includes connecting means similarly retaining the opposite ends of said one race member and both ends of said other race member are connected to one of said shoes.